United States Patent [19]
Gay

[11] 3,756,024
[45] Sept. 4, 1973

[54] METHOD AND APPARATUS FOR COORDINATING PROPULSION IN A SINGLE STAGE SPACE FLIGHT

[75] Inventor: Archibald Gay, San Diego, Calif.

[73] Assignee: General Dynamics Corporation, San Diego, Calif.

[22] Filed: Feb. 23, 1962

[21] Appl. No.: 176,859

[52] U.S. Cl. .................. 60/204, 60/257, 60/270, 60/225, 244/1 SB
[51] Int. Cl. ............................................. B63h 11/00
[58] Field of Search ................ 60/35.6, 39.46, 35.3, 60/35.4, 284, 246, 257, 270

[56] References Cited
UNITED STATES PATENTS

| | | | |
|---|---|---|---|
| 2,877,966 | 3/1959 | Summers | 60/35.6 RL |
| 2,922,286 | 1/1960 | Roe | 60/35.6 RL |
| 2,960,834 | 11/1960 | Kirkpatrick | 60/35.6 RL |
| 3,002,340 | 10/1961 | Landerman | 60/35.6 RL |
| 3,040,520 | 6/1962 | Roe | 60/35.6 RL |
| 2,686,473 | 8/1954 | Vogel | 102/49 S |
| 3,038,408 | 6/1962 | Cluge | 102/49 J |

*Primary Examiner*—Samuel Feinberg
*Attorney*—John R. Duncan

EXEMPLARY CLAIM

1. A method of propelling a space plane from the earth surface through the earth atmosphere into space and then return to the earth surface which plane initially carries fuel and utilizes oxidizer later collected from said atmosphere, comprising the steps of, propelling said plane from said earth's surface to a given altitude and velocity in said atmosphere by liquid air cycle engine propulsion, propelling said plane at an increasing altitude and velocity for a given period of time by ramjet propulsion, collecting liquid air in said plane from said atmosphere during said given period of time, separating said liquid air into nitrogen and liquid oxygen, expelling said nitrogen from said vehicle while storing a sufficient quantity of said liquid oxygen in said plane to facilitate space flight using said liquid oxygen and said fuel in said liquid air cycle engine to propel said plane from said atmosphere into space by rocket propulsion, and flying said plane to said earth's surface.

9 Claims, 6 Drawing Figures

INVENTOR.
ARCHIBALD GAY

ATTORNEYS

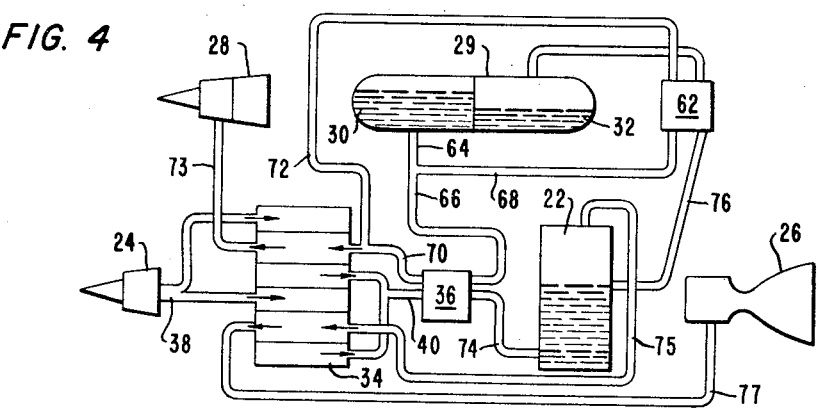
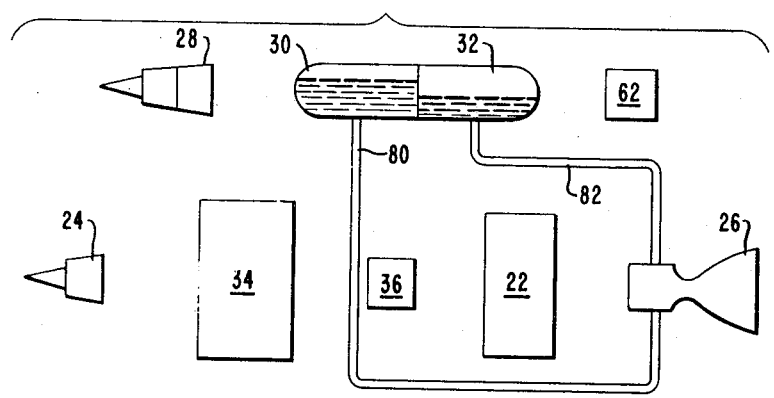
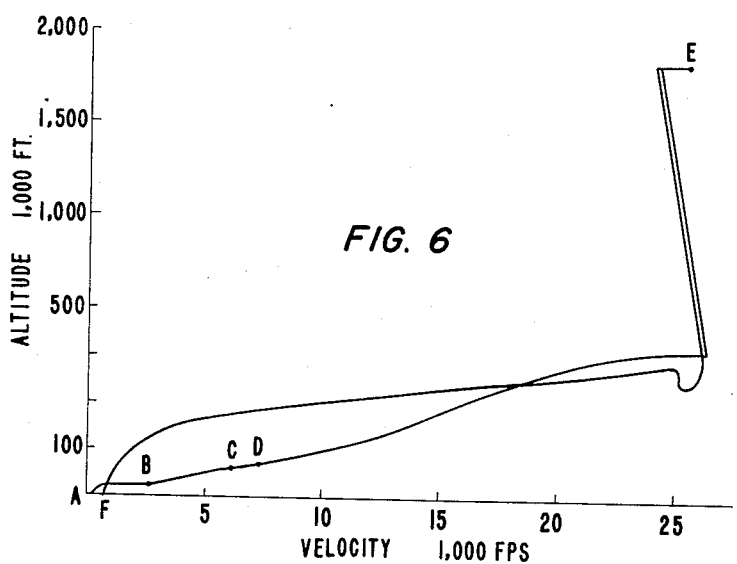

METHOD AND APPARATUS FOR COORDINATING PROPULSION IN A SINGLE STAGE SPACE FLIGHT

The present invention pertains to a method and apparatus for coordinating propulsion in a single stage space flight and more particularly to a method of propelling a vehicle from the surface of the earth to space flight and return to the earth's surface, which vehicle may be manned, and apparatus for propelling the vehicle and collecting oxidizer during a phase of said flight.

The method presently used in propelling objects from the earth's surface into space uses non-recoverable, single stage or multi-stage rocket propulsion. In manned space flight, the occupant rides to earth from space in the nose cone of the rockets. Such a method of propulsion provides little if any capability to maneuver a vehicle from ground to space and back in somewhat the same manner that present day aircraft are maneuvered. Further not recovering the substantial portion of the propelling rocket for subsequent flight makes such flights exceedingly expensive.

It is therefore an object of this invention to provide an improved method of propelling a vehicle from the earth's surface into space.

It is another object of this invention to provide an improved method of propelling a single stage vehicle from the earth's surface into space and back to the earth's surface under manned flight conditions and in a manner where the vehicle is recovered.

It is another object of this invention to provide a propulsion system capable of propelling said vehicle in flight phases while also being capable of functioning to collect oxidizer during the flight.

The method of this invention involves phases of a ground to space flight propulsion pattern in which a vehicle, hereinafter referred to as a space plane, is taken off the earth's surface and moved to a given altitude and velocity. The altitude and velocity are then further increased and at the same time oxidizer is collected which oxidizer is needed in the subsequent rocket phase of flight and which oxidizer was not carried in the space plane when the space plane left the ground surface. The space plane is then moved under rocket propulsion to the speed and altitude required for the space plane to reach space or escape the earth's gravitational pull, and maneuvered in space and then returned to the atmosphere for re-entry and return to the ground surface under controlled flight.

The exact nature of this invention as well as other objects and advantages thereof will be clearly understood from consideration of the following specification when taken in connection with the accompanying drawings in which:

FIG. 4 illustrates operation of the engine and air collection during the ramjet propulsion and oxidizer collection cycle;

FIG. 5 illustrates operation of the engine during rocket propulsion;

FIG. 6 is a graphic illustration of the flight of this invention as it relates to altitude vs. velocity.

Figure 1:
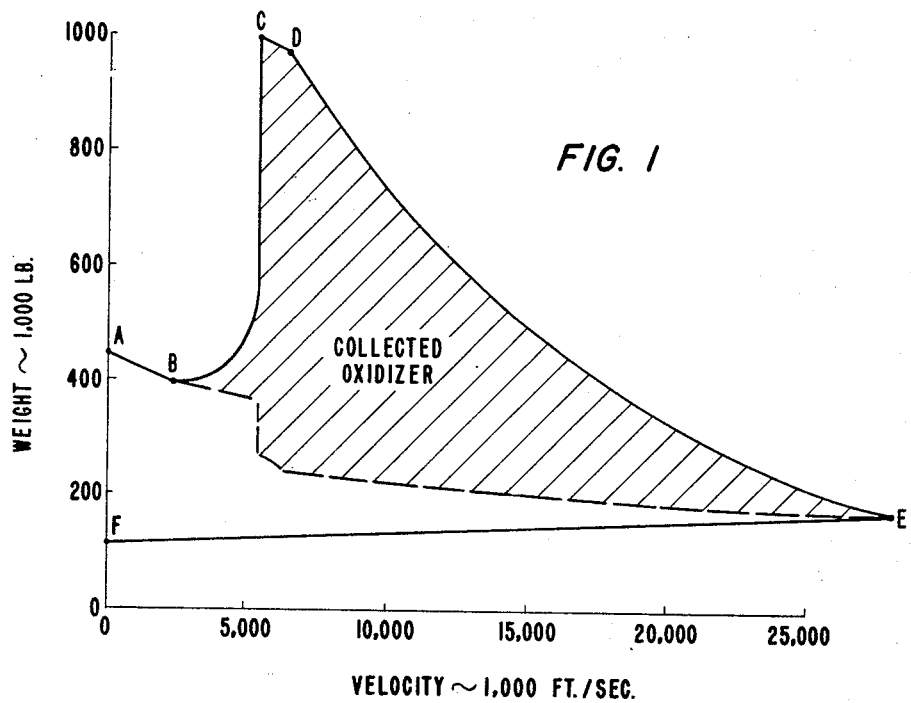
FIG. 1 is a graphic illustration of the method of flight of this invention and illustrates the weight and velocity relationships of the space plane during the flight.

Referring now to FIG. 1, the portion of the weight vs. velocity graph that is effected by the liquid air cycle propulsion phase of the flight is illustrated from point A to point B. The portion of the weight vs. velocity graph of FIG. 1 that is effected by the ramjet propulsion and oxidizer collection phase of the flight is given from B to C. The portion of the weight vs. velocity graph of FIG. 1 that is accomplished during the ramjet propulsion after oxidizer collection has ceased, is shown from C to D. The portion of the weight vs. velocity graph of FIG. 1 that is accomplished during the rocket propulsion phase of the flight is given from D to E. And the portion of the graph in FIG. 1 between E and F is the re-entry and flight home phase of the flight.

Figure 2:
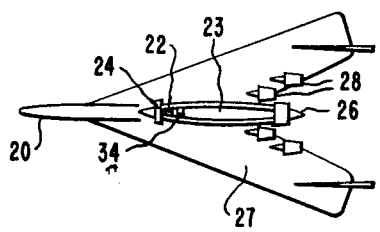
FIG. 2 is a diagrammatic illustration of the space plane that is used in this invention with various components and engines illustrated therein.

Referring to FIG. 2, a space plane 20, for flight both in the earth's atmosphere and in space, may be propelled by ramjet engines 28 and a conventional rocket motor 26, all of which are clustered at the rear intersection of the trailing edge of wings 27. The fuselage portion of space plane 20 is shown containing an air inlet 24, a head exchanger 34 and a separator 22 as exemplary of the mounting of the engine components in the space plane. The wings 27 contain tankage for carrying liquid hydrogen fuel and liquid air or oxygen oxidizer. For exemplary purposes only, the aircraft would have a weight of approximately 450,000 pounds when fully loaded for takeoff. This would be with all available volume in the tankage for carrying liquid hydrogen filled out with little or no liquid oxidizer in the tankage volume for carrying liquid oxidizer. The wings would have a span of 133 feet, a length of 235 feet and a 3 inch leading edge radius.

FIG. 1 shows in graphical form the relationship of the weight of the space plane relative to the velocity of the space plane during the method of flight of this invention. As can be seen the weight of the aircraft will vary from approximately 450,000 pounds at takeoff to a fully loaded weight at the end of the oxidizer collection phase of the flight of approximately 1,000,000 pounds.

Figure 3:
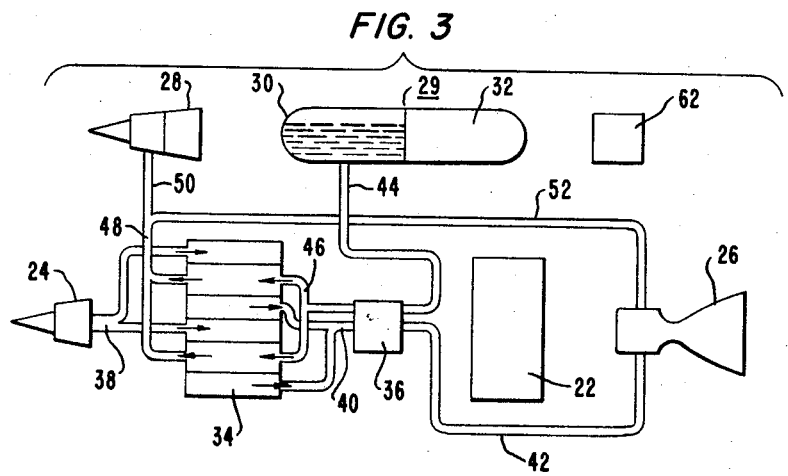
FIG. 3 illustrates diagrammatically the operation of the engine and components of the engine during the period that the engine is operating under liquid air cycle.

As an initial description of the method of coordinated propulsion, the space plane leaves the earth's surface in the normal manner of aircraft and under the propulsive force of a liquid air cycle engine, such as is illustrated in FIG. 3, that uses a conventional rocket motor nozzle 26. The liquid air cycle engine is fueled by liquid hydrogen that is carried in the hydrogen storage portion 30 of the tankage 29. The space plane is also capable of carrying liquid oxidizer in the tankage 29, however, there is very little, if any, liquid oxidizer carried in the space plane at take-off. Rather the liquid oxidizer tanks are filled in flight during the oxidizer or air collection step of the flight. Accordingly the weight of the space plane at take-off is less than the weight the space plane eventually acquires during flight even though fuel carried in the space plane is constantly being used during flight.

In the initial step of the flight pattern the space plane under the propulsion of the liquid air cycle engine accelerates to a speed of approximately 2,300 feet per second and an altitude of approximately 30,000 feet. At this speed and altitude, it is now advantageous to utilize the ramjet portion of the propulsion system. So the liquid air cycle engine is shut down and the ramjet engines are used to propel the space plane. Under this propulsion the space plane is flown from about 30,000 to about 60,000 feet in altitude with the velocity of the space plane being gradually increased from 2,300 feet per second to around 5,300 feet per second. It is during this step of the flight that the oxidizer collection cycle occurs. In the oxidizer collection cycle, air is taken in through the air inlet 24 of the liquid air cycle engine and cooled to approximately its liquid point by the liquid hydrogen used for fuel in the engines and in this phase the ramjets 28. The liquid or semi-liquid air can then be stored in the tankage for later use as oxidizer or the air can be separated by separator 22 into liquid oxygen and nitrogen with the liquid oxygen being transferred to storage and the nitrogen dumped from the space plane. The tankage 32 for storing liquid oxidizer is thus filled to its capacity during flight and the weight of the space plane increases to its heaviest point of approximately 1,000,000 pounds.

When the space plane 20 reaches a speed of approximately 5,300 feet per second and its liquid oxidizer tankage 32 is filled, the space plane is then propelled by the ramjets with no further liquid air collection occurring. In this step of the flight, the velocity of the space plane is increased to 6,300 feet per second and its weight decreased a small amount due to the hydrogen fuel being used. The ramjets are subsequently shut off and the rocket nozzle 26 is supplied with hydrogen and oxidizer from tankage 30 and 32 to provide rocket propulsion to the space plane. During this rocket propulsion portion of the flight, a large amount of both the liquid oxidizer that had been collected and stored in the air collection cycle as well as the liquid hydrogen fuel is consumed, considerably reducing the weight of the space plane. The velocity of the space plane is increased under the rocket propulsion to a point that may exceed 24,500 feet per second, permitting the space plane to maneuver in space and leave the earth's gravitational pull. The space plane is continued to be propelled as a rocket during space maneuvers and then brought back into the earth's atmosphere for the re-entry and controlled glide home portion of its flight cycle.

FIGS. 3 through 5 illustrate the stages of operation of the engines and oxidizer collection equipment during the various steps of flight of the space plane 20. Referring to FIG. 3, a liquid air cycle engine is shown having an air inlet 24 for receiving air during flight of the vehicle. The air entering through inlet 24 is carried by conduits or pipes to both sides of a heat exchanger 34. The air is cooled to a very low temperature in the heat exchanger and is then condensed to substantially a liquid in condenser 36. The liquid air then passes or may be pumped to the nozzle 26 as rocket oxidizer. Liquid hydrogen fuel stored in tankage 30 is conducted by line 44 through condenser 36, through lines 46 to both sections of heat exchanger 34 and then through line 48 to lines 50 and 52 that supply hydrogen fuel to the ramjets 28 and to the rocket nozzle 26. The primary propulsion for the space plane 20 during this relatively low speed portion of the flight is provided by the rocket nozzle 26. However, the liquid air cycle operates rich in hydrogen in order to liquify sufficient quantities of air for operation of the rocket nozzle 26. The extra hydrogen used as coolant is thus fed to the ramjets to minimize their drag during this low speed portion of the flight. During this phase of the flight path, the space plane moves from take-off to a pseed of approximatesly 2,300 feet per second and an altitude of approximately 30,000 feet while its weight decreases.

FIG. 4 depicts the composite space plane engine during the stage of ramjet propulsion and oxidizer collection. Air is received through inlet 24 and conveyed by lines 38 to both sides of the condenser 34 where the air is cooled by the liquid hydrogen fuel and then transported by line 40 to condenser 36. The air is condensed to substantially a liquid or semi-liquid form and is transported by line 74 to the separator 22 which then separates the air into liquid oxygen and nitrogen, which may also be a liquid. The liquid oxygen passes from the separator 22 through line 76 to sub-cooler 62 where it is sub-cooled to a liquid state and deposited in tankage 32 for storage and later use. The liquid nitrogen portion of the separated air is transported by line 75 back to the condenser 34 where it absorbs heat in the heat exchange cycle and is then transported by line 77 to the nozzle 26 for ejection to the atmosphere.

While in FIG. 4, the collected air is separated into oxygen and nitrogen, it should be recognized that the liquid air can be passed directly from line 74 to line 76 for sub-cooling and storage in oxidizer tankage 32. The liquid air would then be used as oxidizer rather than separated liquid oxygen. The separator 22 is of conventional construction and utilizes the reduced temperature of the liquid air to effect separation. Should it be desirable to further cool the liquid air during separation, then hydrogen from tankage 30 can be piped through separator 22.

The liquid hydrogen leaves the portion 30 of the tankage 29 by line 64 and is then distributed as coolant to the condenser and and to the sub-cooler 62 by lines 66 and 68. After absorbing heat in the heat cycles of the condenser and sub-cooler, the hydrogen then passes through lines 70 and 72 to the heat exchanger 34 and then through line 73 to the ramjets 28. The air collected directly from the atmosphere by the ramjets intake provides oxygen for operation of the ramjets. During this cycle of operation, the speed of the space plane is increased to and maintained at approximately 5,300 feet per second or Mach 5.5 and an altitude of approximately 60,000 feet, until all the liquid oxidizer required is collected. to about Following the oxidizer collection cycle, the ramjets 28 are then operated without the collection of air for a period of flight in which the altitude of the space plane is increased to approximately 70,000 feet and the speed of the space plane is increased to approximately 6,300 feet per second. At, or about this speed, it is no longer advantageous to provide propulsion by the ramjet engines. Accordingly at this speed, the propulsion from the ramjets is replaced by rocket propulsion using the collected oxidizer. With reference to FIG. 5, the nozzle 26 is supplied liquid hydrogen through line 80 from tankage 30 and liuqid oxidizer through line 82 from tankage 32. Under the rocket propulsion, the space plane may be increased in speed to and exceeding 24,500 feet per second, at which speed the space plane can escape the earth's atmosphere. With reference to FIG. 6, the space plane reaches the altitude exceeding 1,500,000 feet and begins its space flight. During this portion of the rocket flight the hydrogen and oxidizer in tankage 30 and 32 is used to the extent that the weight of the space plane is reduced to about 200,000 pounds. Sufficient fuel and oxidizer remain in the space plane after its flight into space to permit the space plane to maneuver in space and to return to the atmosphere for re-entry and a controlled glide path back to the earth's surface.

As can be seen the method of the present invention provides for the flight of a space plane under an air breathing type propulsion to a speed of approximately 2,300 feet per second and to an altitude of approximately 30,000 feet. At this point ramjet type propulsion is used to push the space plane to a speed of approximately 5,300 feet per second and an altitude of approximately 60,000 feet, while simultaneously an air collection cycle occurs wherein air is collected and may be liquified by the hydrogen fuel and separated into its oxygen and nitrogen components with the oxygen being liquified and stored in the space plane and the nitrogen being ejected during flight. The ramjet propulsion and oxidizer collection cycle of flight continues until the required liquid oxidizer has been stored during which the space plane is maintained at a speed of approximately 5,300 feet per second and at an altitude of approximately 60,000 feet. Thereupon the space plane is then flown under ramjet operation with no liquid air collection until the space plane reaches approximately 70,000 feet in altitude and a speed of approximately 6,300 feet per second. The ramjet engine is then turned off and the nozzle of the LACE engine is utilized under rocket-type propulsion using the collected oxidizer to accelerate the vehicle into orbit, provide orbital maneuvers and re-enter the atmosphere. The space plane is powered as necessary by ramjet or LACE engine to return the space plane to the ground.

Various modifications are contemplated and may be resorted to by those skilled in the art without departing from the spirit and scope of the invention as hereinafter defined by the appended claims.

I claim:

1. A method of propelling a space plane from the earth surface through the earth atmosphere into space and then return to the earth surface which plane initially carries fuel and utilizes oxidizer later collected from said atmosphere, comprising the steps of, propelling said plane from said earth's surface to a given altitude and velocity in said atmosphere by liquid air cycle engine propulsion, propelling said plane at an increasing altitude and velocity for a given period of time by ramjet propulsion, collecting liquid air in said plane from said atmosphere during said given period of time, separating said liquid air into nitrogen and liquid oxygen, expelling said nitrogen from said vehicle while storing a sufficient quantity of said liquid oxygen in said plane to facilitate space flight, using said liquid oxygen and said fuel in said liquid air cycle engine to propel said plane from said atmosphere into space by rocket propulsion, and flying said plane to said earth's surface.

2. A method of propelling a space plane from the earth surface through the earth atmosphere into sapce and then return to the earth surface which plane has a liquid air cycle engine and ramjet engine propulsion system and which plane initially carries fuel and utilizes oxidizer later collected from said atmosphere, comprising the steps of, propelling said plane from said earth surface to an altitude and velocity in said atmosphere by liquid air cycle engine propulsion, propelling said plane at an increasing altitude and velocity for a period of time by ramjet propulsion, collecting liquid air in said plane from said atmosphere during said period of time and storing said liquid air in said plane in sufficient quantities to facilitate space flight, increasing the speed of said plane by ramjet propulsion after said liquid air is collected, using said liquid air and said fuel in said nozzle of said liquid air cycle engine to propel said plane from said atmosphere into space by rocket propulsion, maneuvering said plane is space under said rocket propulsion, and flying said plane to said earth surface.

3. A method of propelling a space plane from the earth surface through the earth atmosphere into space and then return to the earth surface which plane has a liquid air cycle engine and ramjet engine propulsion system and which plane initially carries fuel and utilizes oxidizer later collected from said atmosphere, comprising the steps of, propelling said plane from said earth surface to an altitude and velocity in said atmosphere by said liquid air cycle engine propulsion, propelling said plane at an increasing altitude and velocity for a period of time by ramjet propulsion, utilizing the air collection system of said liquid air cycle engine to collect liquid air in said plane from said atmosphere during said period of time, separating said liquid air into nitrogen and liquid oxygen, expelling said nitrogen from said plane, and storing said liquid oxygen in said plane in sufficient quantities to facilitate space flight, increasing the speed of said plane by ramjet propulsion after said liquid air is collected, using said liquid oxygen and said fuel in said liquid air cycle engine to propel said plane from said atmosphere into space by rocket propulsion, maneuvering said plane in space under said rocket propulsion, and flying said plane to said earth's surface.

4. A method of propelling a space plane from the earth surface through the earth atmosphere into space and then return to the earth surface which plane has a given maximum weight at take-off and has a liquid air cycle engine and ramjet engine propulsion system and which plane initially carries fuel and utilizes oxidizer later collected from said atmosphere, comprising the steps of, propelling said plane from said earth surface to an altitude and velocity in said atmosphere by said liquid air cycle engine propulsion, propelling said plane at an increasing altitude and velocity for a period of time by ramjet propulsion, collecting liquid air in said plane from said atmosphere during said period of time and storing said liquid air in said plane to an extent that the weight of said plane in this phase of flight exceeds said maximum weight at take-off, using said liquid air and said fuel in said nozzle of said liquid air cycle engine to propel said plane from said atmosphere into space by rocket propulsion.

5. A method of propelling a space plane from the earth surface through the earth atmosphere into space and then return to the earth surface which plane has a maximum weight at take-off and has a liquid air cycle engine and ramjet engine propulsion system and which plane initially carries fuel and utilizes oxidizer later collected from said atmosphere, comprising the steps of, propelling said plane from said earth surface to an altitude and velocity in said atmosphere by said liquid air cycle engine propulsion, propelling said plane at an increasing altitude and velocity for a period of time by ramjet propulsion, utilizing the air collection system of said liquid air cycle engine to collect liquid air in said plane from said atmosphere during said period of time, separating said liquid air into nitrogen and liquid oxygen, expelling said nitrogen from said plane through the nozzle of said liquid air cycle engine while storing said liquid oxygen in said plane to an extent that the weight of said plane in this phase of flight exceeds said maximum weight at take-off, increasing the speed of said plane by ramjet propulsion after said liquid air is collected, using said liquid using said liquid oxygen and said fuel in said nozzle of said liquid air cycle engine to propel said plane from said atmosphere into space by rocket propulsion, maneuvering said plane in space under said rocket propulsion, and flying said plane to said earth's surface.

6. A method of propelling a space plane from the earth surface through the earth atmosphere into space and then return to the earth surface which plane has a liquid air cycle engine and ramjet engine propulsion system and which plane initially carries fuel having a very low temperature and utilizes oxidizer later collected from said atmosphere, comprising the steps of, propelling said plane from said earth surface to an altitude and velocity in said atmosphere by said liquid air cycle engine propulsion, utilizing said fuel as coolant and fuel in said liquid air cycle engine, passing a portion of said fuel used as coolant in said liquid air cycle engine to said ramjet engines, propelling said plane at an increasing altitude and velocity for a period of time by ramjet propulsion, utilizing the air collection system of said liquid air cycle engine to collect liquid air in said plane from said atmosphere during said period of time, separating said liquid air into nitrogen and liquid oxygen, utilizing said fuel as coolant in said separation, liquid oxygen, expelling said nitrogen from said plane, and storing said liquid oxygen in said plane, using said liquid oxygen and said fuel in said liquid air cycle engine to propel said plane from said atmosphere into space by rocket propulsion.

7. A method of propelling a space plane from the earth surface through the earth atmosphere into space and then return to the earth surface which plane has a liquid air cycle engine and ramjet engine propulsion system and which plane initially carries fuel having a very low temperature and utilizes oxidizer later collected from said atmosphere, comprising the steps of, propelling said plane from said earth surface to a given altitude and velocity in said atmosphere by said liquid air cycle engine propulsion, utilizing said fuel as coolant and fuel in said liquid air cycle engine, passing a portion of said fuel used as coolant in said liquid air cycle engine to said ramjet engines, propelling said plane at an increasing altitude and velocity for a given period of time by ramjet propulsion, utilizing the air collection system of said liquid air cycle engine to collect liquid air in said plane from said atmosphere during said given period of time, separating said liquid air into nitrogen and oxygen, utilizing said fuel as coolant in said separation, sub-cooling said oxygen to liquid oxygen, expelling said nitrogen from said plane through the nozzle of said liquid air cycle engine while storing said liquid oxygen in said plane, increasing the speed of said plane by ramjet propulsion after said liquid air is collected, using said liquid oxygen and said fuel in said nozzle of said liquid air cycle engine to propel said plane from said atmosphere into space by rocket propulsion, maneuvering said plane in space under said rocket propulsion, and flying said plane to said earth's surface.

8. In a single stage propulsion system for propelling a space plane in a flight from the earth's surface through the earth's atmosphere into space which plane initially carries fuel having a very low temperature and utilizes oxidizer collected from said atmosphere during said flight for said space portion of said flight comprising, a liquid air cycle engine having air intake means for collecting air, heat exchanger means for cooling said air, condenser means for cooling said air to substantially a liquid, tankage means for storing said substantially liquid air, said heat exchanger means and said condenser means utilizing passage of portions of said fuel therethrough for coolant, ramjet means for propelling said space plane and for utilizing said portions of said fuel passing through said heat exchanger in its operation.

9. In a single stage propulsion system for propelling a space plane in a flight from the earth's surface through the earth's atmosphere into space which plane intially carries fuel having a very low temperature and utilizes oxidizer collected from said atmmosphere during said flight for said space portion of said flight comprising, a liquid air cycle engine having air intake means for collecting air, heat exchanger means for cooling said air, condenser means for cooling said air to substantially a liquid, separator means for separating said substantially liquid air into nitrogen and oxygen, tankage means for storing said oxygen, said heat exchanger means and said condenser means utilizing passage of portions of said fuel therethrough for coolant, ramjet means for propelling said space plane and for utilizing said portions of said fuel passing through said heat exchanger in its operation.

* * * * *